United States Patent [19]

Fong

[11] Patent Number: 4,763,294

[45] Date of Patent: Aug. 9, 1988

[54] METHOD AND APPARATUS FOR FLOATING POINT OPERATIONS

[75] Inventor: Anthony S. Fong, Southboro, Mass.

[73] Assignee: Wang Laboratories, Inc., Lowell, Mass.

[21] Appl. No.: 810,795

[22] Filed: Dec. 19, 1985

[51] Int. Cl.⁴ .............................................. G06F 7/38
[52] U.S. Cl. ..................................... 364/748; 364/200
[58] Field of Search ................ 364/748, 200 MS File, 364/900 MS File, 736

[56] References Cited

U.S. PATENT DOCUMENTS

| | | | |
|---|---|---|---|
| 3,871,578 | 3/1975 | Van de Goor et al. | 364/748 |
| 4,161,784 | 7/1979 | Cushing et al. | 364/748 |
| 4,229,801 | 10/1980 | Whipple | 364/748 |
| 4,589,067 | 5/1986 | Porter et al. | 364/748 |
| 4,612,628 | 9/1986 | Beauchamp et al. | 364/748 |
| 4,654,785 | 3/1987 | Nishiyama et al. | 364/748 |

Primary Examiner—Gary V. Harkcom
Assistant Examiner—Long Thanh Nguyen
Attorney, Agent, or Firm—Michael H. Shanahan; Gordon E. Nelson

[57] ABSTRACT

An information processing system having a memory for storing instructions and operands, a central processor unit which includes a mechanism for fetching and decoding instructions and operands and a bus connected between the processor unit and memory. An associated floating point unit is coupled to the bus and is responsive to floating point instructions for performing floating point operations. The floating point unit and the central processing unit may perform operations independently of the other or may be synchronized to one another, depending upon the type of instruction. A floating point instruction is determined to be a member of a first group of instructions requiring interlock of operation between the central processor unit and the floating point unit or is determined to be a member of a second group of instructions not requiring interlock of operation. The central processor unit is responsive to the occurrence of an instruction of the first group and to an idle state in the floating point unit for dispatching an instruction of the first group to the floating point unit for execution and is responsive to the occurrence of an instruction of the second group and an available state in the floating point unit for dispatching an instruction of the second group.

23 Claims, 4 Drawing Sheets

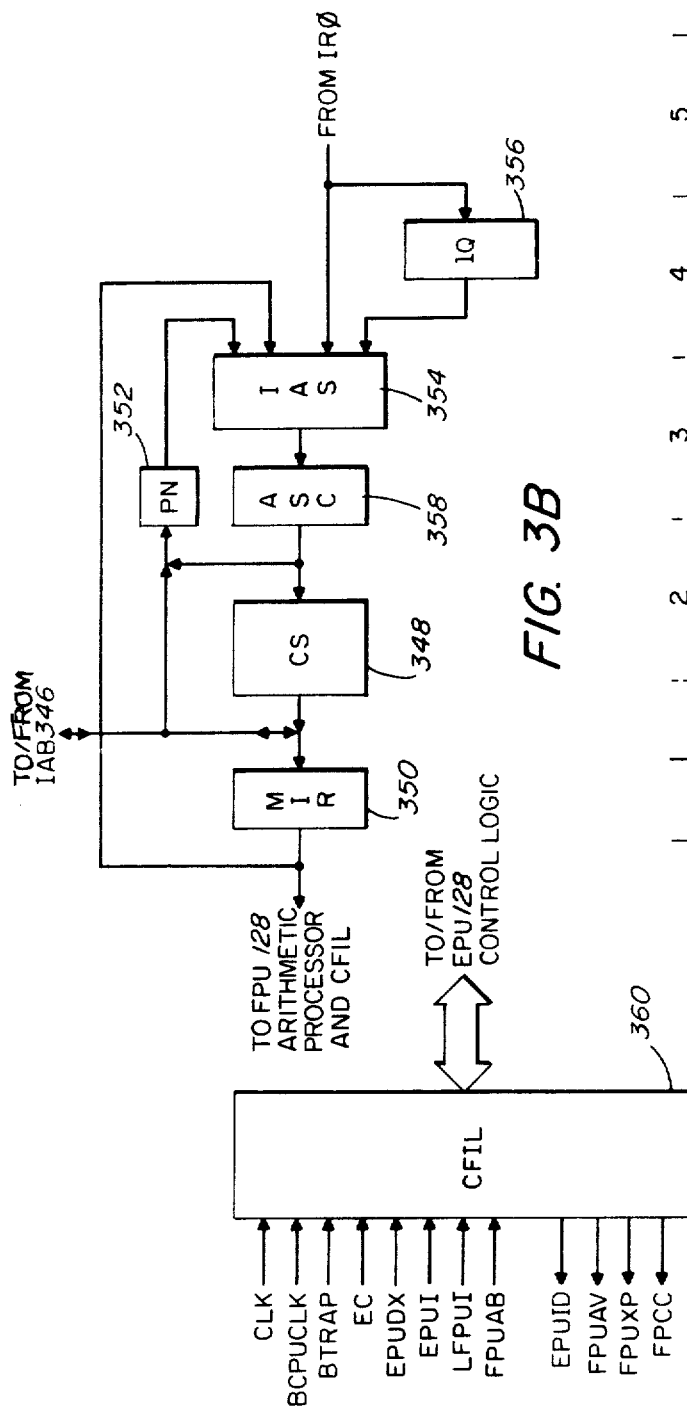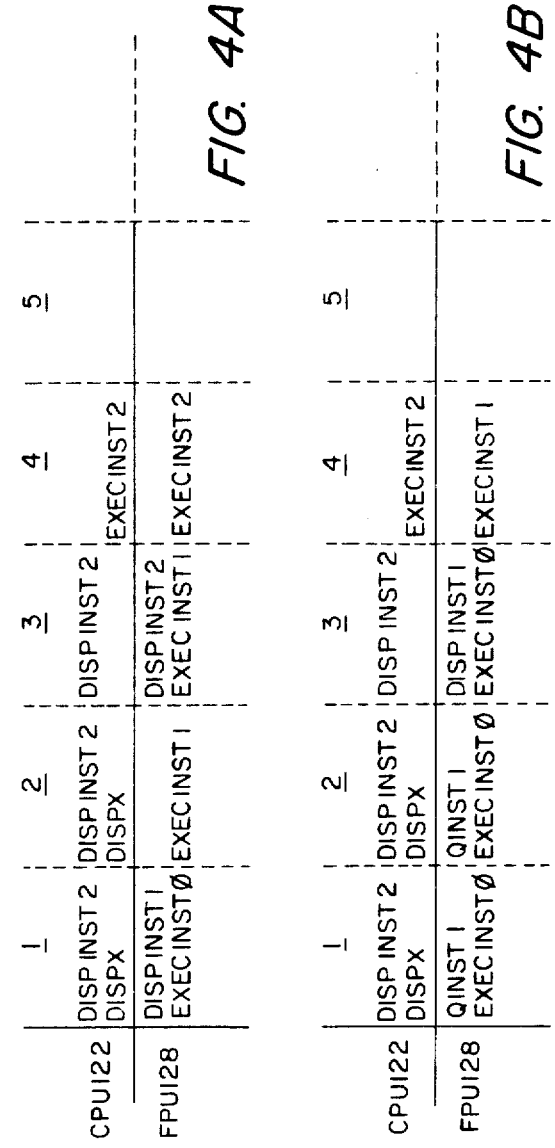

METHOD AND APPARATUS FOR FLOATING POINT OPERATIONS

CROSS REFERENCES TO RELATED APPLICATIONS

The present patent application is related to U.S. patent application No. 730,977, filed May 6, 1985 and assigned to the assignee of the present patent application.

BACKGROUND OF THE INVENTION

1. Field of the Invention

The present invention relates to methods and apparatus for performing floating point mathematical operations in an information processing system and, more particularly, to methods and apparatus for controlling the operation of a floating point unit in executing floating point instructions.

2. Description of the Prior Art

In many information processing systems it is necessary, or at least desirable, to be able to perform floating point mathematical operations, for example, in performing the mathematical calculations involved in the technical and scientific fields. While some few computers are designed specifically for scientific and technical applications, the majority of systems are designed for general purpose applications and the problem becomes one of providing the specialized capability for floating point operations in a geneal purpose system.

The approaches used in the past to provide this capability may be generally referred to as emulation, an independent floating point processor and an associated floating point processor. In the first, floating point operations are performed by means of floating point emulation software running on the system's general purpose central processing unit. That is, software which makes the central processor operate like, or emulate, a floating point processor. Because a general purpose central processing unit is generally not designed for floating point operations, the central processing unit is generally both slow and inefficient in performing these operations. This approach has therefore been unsatisfactory except where the frequency of floating point operations is low enough that the inefficiencies and lack of speed are acceptable.

In the other extreme, some systems are provided with a completely separate and independent floating point processor which operates in parallel with the central processor for the specific purpose of performing floating point operations. While an independent floating point processor is may be quite fast and efficient at floating point operations, it generally represents a substantial investment in terms of system cost. That is an independent floating point, processor will, in general, have all of the operating elements and thus cost, of a general purpose central processing unit but is usable only for the special function of performing floating point operations. In addition, the central processing unit, the floating point unit and the system as a whole will be more complex, and thus more expensive, due to the inherent complexities of a system having more than one independent processing unit. This approach has therefore been fully justified only in systems primarily dedicated to scientific and technical applications.

In the third and most common approach, the central processor unit is provided with an associated floating point unit which essentially operates as an addition or extension to the arithmetic and logic unit in the central processing unit. That is, the associated floating point unit will contain the specialized arithmetic and logic elements for floating point operations and will share other elements, such as the instruction and operand fetch and decode mechanisms and microcode control mechanisms, of the central processing unit.

The principal problem with this approach is in obtaining a desirable speed of operation of both the central processing unit and the floating point unit. That is, due to the sharing of elements' either the central processing unit or the floating point unit must delay operation until the other unit has completed its operations. For example, in many systems the central processing unit will perform memory read and write operations and certain control functions for the floating point unit, so that the central processing unit must suspend execution of its own operations to service the floating point unit during floating point operations. Likewise, the floating point unit must frequently delay the execution of operations until the central processing unit is free to provide support for the floating point unit.

The present invention provides improved methods and apparatus for executing floating point operations which solves these and other problems of the prior art.

SUMMARY OF THE INVENTION

The present invention relates generally to information processing systems having a memory for storing instructions and operands, a central processor unit which includes a mechanism for fetching and decoding instructions and operands and a bus connected between the processor unit and memory for communicating instructions and operands therebetween. There is provided an associated floating point unit connected from the bus and responsive to decoded floating point instructions for performing floating point operations. The floating point unit and the central processing unit each include an independent clock and microcode control, so that each may perform operations independently of the other.

The floating point unit operates in parallel with the central processing unit to execute floating point instructions appearing in the instruction stream. In essence, floating point instructions appearing in the instruction stream, and their associated operands, are fetched from memory in the same manner as non-floating point instructions but, rather than being transferred into and executed by the central processing unit, are loaded into and executed by the floating point unit. Floating point and non-floating point operations may thereby be executed in parallel in that the central processing unit is freed to proceed with the execution of at least certain non-floating point instructions without having to wait for the completion of floating point instructions.

The floating point unit is not provided with an instruction/operand fetch mechanism and does not have access, in itself, to either read or write memory. The central processing unit performs all instruction and operand fetch operands and all data writes for the floating point unit, so that for certain floating point operations, specifically those requiring a read from or write to memory, the floating point unit is dependent upon the central processing unit and the units cannot operate independently.

The present invention provides improved methods and apparatus for executing floating point operations and controlling and coordinating the operations of the central processing unit and floating point unit so as to reduce the periods in which the operations of one unit are dependent upon the other. The overall speed of execution of the system is thereby increased by the periods in which the units may operate independently and in parallel in executing operations.

In the present invention, there is provided a means for determining whether a floating point instruction is a member of a first group of instructions requiring interlock of operation between the central processor unit and the floating point unit or is a member of a second group of instructions not requiring interlock of operation between the central processor unit and the floating point unit. There is further a means for determining whether the floating point unit is in an idle state or is in an available state. There is also a means responsive to the occurrence of an instruction of the first group and to an idle state in the floating point means for dispatching an instruction of the first group to the floating point unit for execution. This means is also responsive to the occurrence of an instruction of the second group and an available state in the floating point unit for dispatching an instruction of the second group to the floating point unit for execution.

The floating point unit includes a means for determining, in each cycle of operation, whether the floating point unit is either available or idle. This means will assert an available signal to the central processor unit when the floating point unit is free to accept a next instruction and will assert an idle signal when the floating point unit is free to accept a next instruction and is not presently executing an instruction or will not be executing an instruction in the next cycle of operation.

The central processing unit is further responsive to the occurrence of a floating point instruction for asserting to the floating point unit a load instruction signal indicating that the central processor means has detected a floating point instruction. The floating point unit is in turn responsive to a load instruction signal from the central processor unit for receiving the floating point instruction from the central processor unit.

The central processing unit further asserts a data transfer signal indicating that a data transfer is to be executed upon detecting a floating point instruction of the first group wherein a transfer of data between the floating point unit and the memory is required. The central processing unit also asserts, in association with the data transfer signal, an end of central processor cycle signal indicating when the bus is available for a data transfer. The floating point unit in turn is responsive to the data transfer signal and the end of cycle signal for synchronizing the floating point clock to the central processor clock and executing the data transfer required by the instruction.

Finally, the central processor is responsive to the occurrence of a floating point instruction and asserts an instruction signal indicating that a floating point instruction is being dispatched to the floating point unit. The floating point unit in turn includes an instruction address register connected from the bus for receiving and storing the address of a floating point instruction to be executed by the floating point unit and is responsive to the instruction signal for loading the instruction address from the bus and into the instruction address register. Upon the occurrence of an exception condition in the floating point means, the floating point unit will assert an exception signal and will transfer the address of the instruction in which the exception condition occurred from the instruction address register to the bus. The central processor will then respond to the exception signal by receiving the instruction address from the bus and initiating a corresponding exception handling operation.

It is thus an object of the present invention to provide an improved floating point unit.

It is a further object of the present invention to provide an improved floating point unit and associated means for controlling the execution of floating point operations.

Other objects and advantages of the present invention will be apparent to those of ordinary skill in the art after the following description of a presently preferred embodiment of the present invention, and an examination of the drawings, wherein:

BRIEF DESCRIPTION OF THE DRAWINGS

FIG. 3B is a block diagram illustrating a floating point unit control unit; and, FIGS. 4A and 4B are timing diagrams illustrating the dispatch and execution of, respectively, FPULOCK and FPUINST instructions by CPU 122 and FPU 128.

DESCRIPTION OF A PREFERRED EMBODIMENT

The following description presents the structure and operation of a computer system incorporating a presently preferred embodiment of the present invention. In the following description, the structure and operation of the system will first be presented at an overall block diagram level. Certain features and principles of operation of the system, and in particular of the system processor unit, will then be described in further detail. Finally, the floating point processing unit (FPU) of the present invention will be described.

Certain reference number and drawing conventions are used throughout the following descriptions to enhance the clarity of presentation. In particular, reference numbers referring to system elements appearing in the figures are comprised of three or four digits. The two least significant (rightmost) digits identify a particular element appearing in a particular drawing and the one to two most significant (leftmost) digits refer to the figure in which that element first appears. For example, a particular system element may first appear as the 12th element in FIG. 1; that element would then be referred to by the reference number 112. Similarly, an element first appearing as the 9th element in FIG. 2 would be referred to by the designation 209. Any such reference number is, as just described, assigned the first time a particular element appears in the following description and will then be used throughout the remainder of the description whenever that element is referred to. For example, element 209, which would first appear in FIG. 2, may also appear in FIG. 3 wherein it will continue to be identified by reference number 209.

A. Block Diagram Structure and Operation (FIG. 1)

Figure 1:
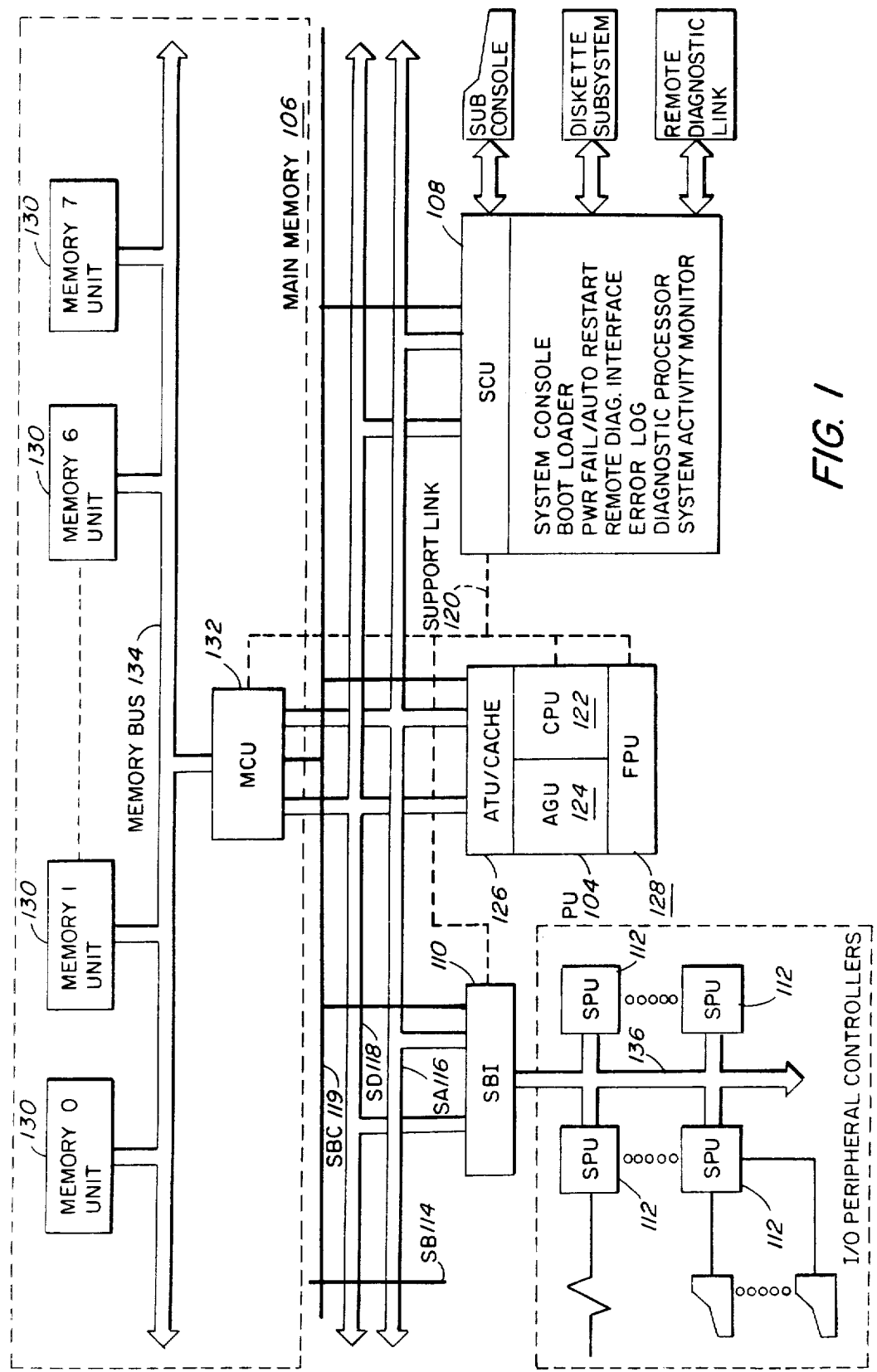
FIG. 1 is a block diagram of a computer system incorporating the present invention.

Referring to FIG. 1, therein is presented a block diagram of a System 102 incorporating the present invention. As indicated therein, System 102 includes a Processor Unit (PU) 104, a Main Memory (MM) 106, a System Control Unit (SCU) 108, and a System Bus Interface (SBI) 110 with one or more Satellite Processing Units (SPUs) 112. These elements are bidirectionally connected to and interconnected by a System Bus (SB) 114 which is comprised of a bidirectional System Address (SA) Bus 116, a bidirectional Memory Control (MC) Bus 117, a bidirectional System Data (SD) Bus 118 and a System Bus Control (SBC) Link 119. SA Bus 116 and SD Bus 118 provide, respectively, for the transfer of addresses and data among the elements of System 102 while MC Bus 117 provides for the control of MM 106 operations. SBC Link 119 provides a mechanism for controlling access to SB 114 by the various users of SB 114, for example, PU 104, MM 106, SCU 108 and SBI 110. Certain elements of System 102, again, for example, PU 104, SCU 108, MM 106 and SBI 110, are further interconnected through Support Link (SL) Bus 120. As described further below, SL Bus 120 provides access and communication between SCU 108 and the internal operations of certain elements of System 102.

Referring first to PU 104, as indicated in FIG. 1 PU 104 includes a Central Processor Unit (CPU) 122, an Address Generator Unit (ACU) 124, an Address Translation Unit/Cache (ATU/C) 126 and a Floating Point Unit (FPU) 128. Each of these elements, and in particular FPU 128, will be described in further detail below.

Referring to MM 106, as indicated in FIG. 1 MM 106 includes one or more Memory Units (MUs) 130 for storing data and instructions and a Memory Control Unit (MCU) 132 which controls the reading and writing of data and instructions from and to MUs 130. MCU is connected from SA Bus 116, MC Bus 117, SD Bus 118 and SBC Link 119 and is one of the System 102 elements connected from SL Bus 120.

SCU 108 primarily performs overall system control and support operations. As indicated in FIG. 1, SCU 108 may operate as a system console and may provide a diskette subsystem, for example, for the loading of microcode into PU 104. SCU 108 may also provide local diagnostic functions, and may provide a link for remote diagnostics. Other functions of SCU 108 may include power failure and automatic restart functions, error logging and system activity monitoring.

Referring finally to SBI 110 and SPUs 112, SPUs 112 are intelligent controllers/interfaces for peripheral devices, such as printers, communications links, terminals and disc drives. SPUs 112 are in turn connected with SBI 110 through Input/Output (IO) Bus 136. SBI 110 operates, in cooperation with SPUs 112, as a communications interface between 10 Bus 136 and System Bus 114 to transfer information between the peripheral devices and the elements of System 102.

B. PU 104 Block Diagram (FIG. 2)

Figure 2:
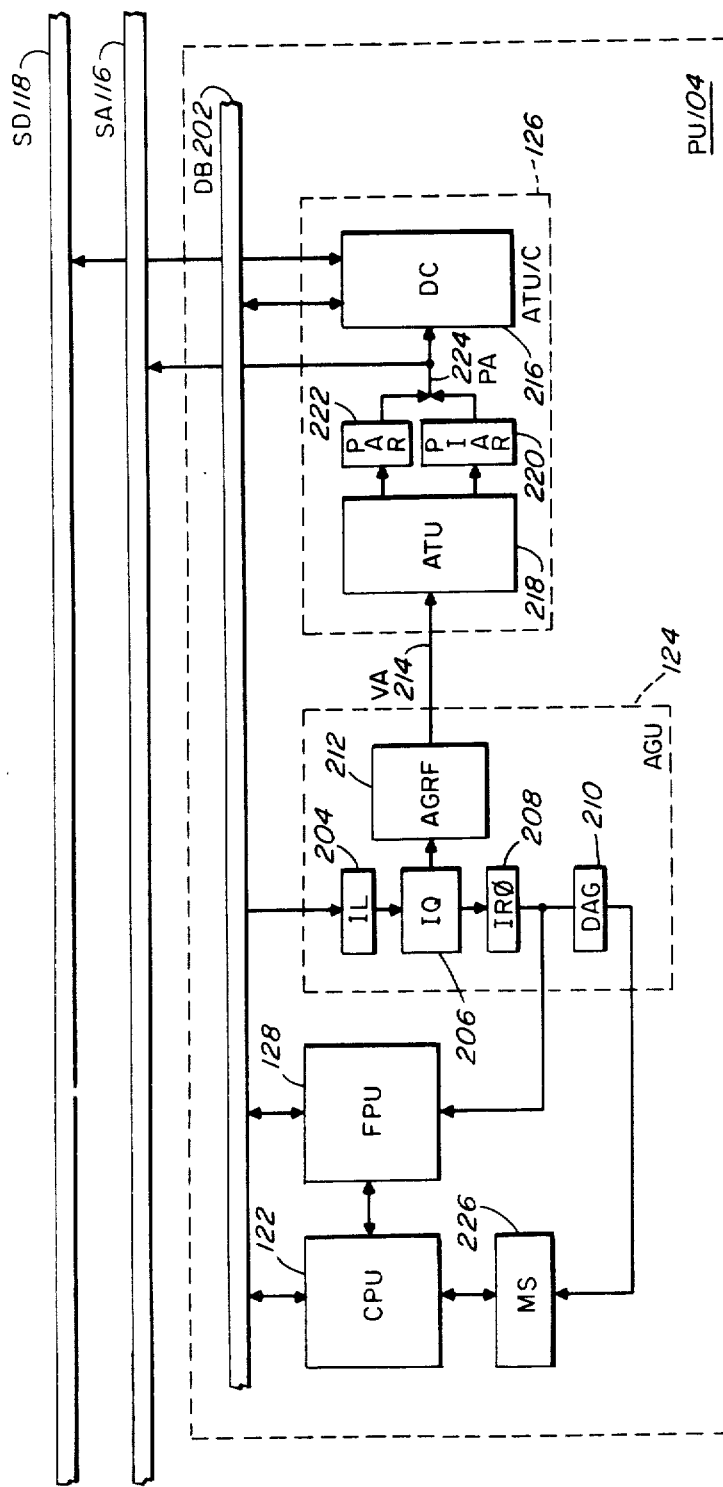
FIG. 2 is a block diagram of the central processor of the present computer system.

Referring to FIG. 2, therein is presented a block diagram of PU 104. As indicated therein, major elements of PU 104, that is, CPU 122, AGU 124, ATU/C 126 and FPU 128, are interconnected in part through PU 104 internal Data (DB) Bus 202. As described further below, DB Bus 202 is the primary path through which data and instructions are communicated among the elements of PU 104.

Referring now to the elements of PU 104, Central Processor Unit (CPU) 122 executes operations on data under the control of processes, that is, under control of instructions received during execution of a program. In this regard, a process may be described as an entity for executing programs for a user and as being represented by an address space and a current state of execution of a program. Further in this regard, CPU 122 and the associated elements of PU 104 are microprogram controlled, with CPU 122 executing one instruction each CPU cycle and one microinstruction at a time.

CPU 122 primarily performs binary and decimal integer arithmetic and logical operations and executes general instructions of the types described further below. CPU 122 also performs certain address generation operations in support of Address Generator Unit (AGU) 124, for example, instruction address relative calculations. CPU 122 further generates and maintains a system Program Control Word used in control of PU 104. CPU 122 also generates microinstruction branch addresses and performs literal field constant operations using literal fields received from a microcode sequencer.

Associated with CPU 122 is Address Generator Unit (AGU) 124, which includes, as described in the following, an instruction prefetch and queue mechanism. AGU 124 fetches instructions and generates, from the fields of the instructions, virtual addresses referring to operands to be operated upon by those instructions and dispatch addresses identifying microinstruction routines for executing those instructions. AGU 124 also generates, again from the fields of current instructions, virtual addresses of next instructions to be executed.

As indicated in FIG. 2, AGU 124 includes Instruction Latches (IL) 204 and an Instruction Queue (IQ) 206 for fetching and storing instructions in advance of the execution of those instructions by CPU 122. IQ 206 includes the logic necessary to extract from the instructions the operation code (opcode) fields used for dispatch addressing of microinstruction routines and the operand related fields containing information identifying the operands to be operated upon by the microinstruction routines.

Associated with IQ 206 is Instruction Register 0 (IR0) 208, which is a part of IQ 206, and Dispatch Address Generator Register (DAG) 210. As described further below, DAG 210 holds the dispatch address of the current instruction to be executed while IR0 208 holds the next instruction to be executed. AGU 124 further includes an Address Generator Register File (AGRF) 212 for storing information used to calculate addresses. AGRF 212 may contain, for example, registers assigned to store base addresses and includes the decoding and arithmetic logic necessary to generate, from the instructions, virtual addresses referring to instructions and operands to be operated upon.

As described further below, AGU 124 and CPU 122 may be respectively described as instruction operation and execution operation units. AGU 124 and CPU 122 operate separately and concurrently to provide overlap of instruction fetching and decoding, operand fetching and instruction execution.

Associated with CPU 122 and AGU 124 is Address Translation Unit/Cache (ATU/C) 126, which operates as the data and address path between PU 104 and other elements of System 102, that is, as the path between the internal elements of PU 104 and SA Bus 116 and SD Bus 118. As shown in FIGS. 1 and 2, CPU 122, FPU 128 and AGU 124 are linked together and to ATU/C 126 through DB Bus 202 while AGU 124 is further linked to ATU/C 126 through Virtual Address (VA) Bus 214.

ATU/C 126 in turn is connected between DB Bus 202 and VA Bus 214 and SA Bus 116 and SD Bus 118.

Considering first PU 104's internal data and instruction path, as shown in FIG. 2 ATU/C 126 includes a Data Cache (DC) 216 bidirectionally connected between SD Bus 118 and DB Bus 202. In addition to serving as the primary data/instruction path between SD Bus 118 and DB Bus 202, DC 216 operates as a cache mechanism to store and provide instructions and operands in advance of the operations of CPU 122 and FPU 128. In particular, instructions and operands are read into and stored in DC 216 from SD Bus 118 and are subsequently read from DC 216 and to CPU 122, AGU 124 and FPU 128 through DB Bus 202. Data to be writhen to SD Bus 118 from CPU 122 or FPU 128 is read through DB Bus 202 to DC 216 and througt DC 216 to SD Bus 118.

Considering PU 104's internal address paths, as previously described, AGU 124 generates virtual addresses, that is, addresses of instructions and operands relative to the address space of an process. These virtual addresses are in turn provided to ATU/C 126, and in particular to Address Translation Unit (ATU) 218, through VA Bus 214.

ATU 218 comprises the address path between VA Bus 214 and SA Bus 116 and DC 216, and includes, in part, a cache mechanism for translating virtual addresses into physical addresses. Associated with and connected from ATU 218 are a Physical Instruction Address Register (PIAR) 220 for storing and providing current physical instruction addresses and a Physical Address Register (PAR) 222 for storing and providing current physical operand and data addresses. As shown in FIG. 2, the outputs of PIAR 220 and PAR 222 are connected through Physical Address (PA) Bus 224 to SA Bus 116 to control the reading and writing of instructions and operands between SD Bus 118 and DC 216 and to DC 216 to control the reading and writing of instructions and operands between DC 216 and DB Bus 202.

In this respect, and as will be described further below, AGU 124 and CPU 122 operate together with ATU/C 126 to provide overlap of instruction fetching, instruction decoding, operand fetching and instruction execution.

As previously described, PU 104 is a microcode controlled machine which executes operations on data under the control of processes, that is, under control of instructions received during execution of a program. This microcode control is provided by Microsequencer (MS) 226 in response, for example, to dispatch addresses provided from AGU 124's DAG 210 as a result of the decoding of instructions, and to certain conditions and tests arising during operation of PU 104.

Finally, and as described above, PU 104 includes a Floating Point Unit (FPU) 128 for performing floating point arithmetic operations concurrently with other operations of PU 104, for example, those of CPU 122. As indicated in FIG. 2, FPU 128 has a bidirectional data connection to DB Bus 202, a control input from CPU 122 and a floating point instruction selection input from AGU 124's IRO 208.

As will be described further below, FPU 128 operates in parallel with CPU 122 to execute floating point instructions appearing in the instruction stream. In essence, floating point instructions appearing in the instruction stream, and their associated operands, are fetched from ATU/C 126 in the same manner as non-floating point instructions but, rather than being transferred into and executed by CPU 122, are loaded into and executed by FPU 128. Floating point and non-floating point operations may thereby be executed in parallel in that CPU 122 is freed to proceed with the execution of at least certain non-floating point instructions without having to wait for the completion of floating point instructions.

In this regard, and as described in further detail below, FPU 128 is not provided with an instruction/operand fetch mechanism and does not have access, in itself, to either MM 106 or the instructions and operands encached in DC 216 unless, of course, the operands are residing in FPU 128's registers. CPU 122. operating in conjunction with AGU 124 and ATU/C 126. performs all instruction and operand fetch operands and all data writes for FPU 128. For this reason, the instruction/operand fetch and data write operations of CPU 122 AGU 124 and ATU/C 126 will be described next below, before proceeding with a detailed description of FPU 128.

FPU 128, the object of the present invention, will be described in further detail below, after a description of the fetching of instructions and operands from DC 216 to CPU 122 and AGU 124.

C. Fetching of Instructions and Operands

As described above, AGU 124 and CPU 122 operate together with ATU/C 126 to provide overlap of instruction and operand fetching and instruction decoding and execution. As also described above, DC 216 operates in part to fetch and store instructions and operands from MM 106 in anticipation of the operations of PU 104 and to provide these instructions and operands to, respectively, AGU 124 and CPU 122 as required. DC 216 further operates as the write-back path from CPU 122 to MM 106 for operands resulting from the operations performed by CPU 122. The reading and writing of operands between DC 804 and CPU 122 or FPU 128 are performed in response to operand read/write addresses provided through the operation of AGU 124 and ATU 218's PAR 220. The reading of instructions from DC 216 to AGU 124, that is, to IQ 206, is performed in response to next instruction addresses provided through the operation of CPU 122 and ATU 218's PIAR 220.

The speed of operation of PU 104, and in particular of CPU 122 and FPU 128, is determined in part by the speed with which instructions and operands may be transferred from DC 216 to CPU 122, FPU 128 and AGU 124 and the results of CPU 122 or FPU 128 operations transferred to DC 216 for subsequent transfer to SD Bus 118. For this reason, CPU 122, FPU 128, AGU 124 and ATU/C 126 are designed to interactively cooperate in an overlapped and interleaved instruction/operand read/write cycle so that there is effectively a continuous flow of instructions and operands between DC 216 and CPU 122 and FPU 128.

This fetch/write mechanism, which includes CPU 122, FPU 128, AGU 124 and ATU 218 with associated PIAR 220 and PAR 222, operates in an overlapped and interleaved manner to fetch instructions from DC 216 and to read and write operands between CPU 122 or FPU 128 and DC 216. In any given CPU cycle, wherein a CPU cycle is defined by the execution of an instruction and is deliniated by successive edges of a CPU Clock (CPUC), an instruction will be fetched and an operand may be read from or writhen to DC 216.

The start of each CPU cycle is marked by a first, or rising, edge of the CPUC and the sequence of events occurring thereafter depend upon whether an operand read or write is pending. If an operand read or write is pending, an operand read or write address will be provided to DC 216 upon the first edge of CPUC, that is, the CPUC edge starting the CPU cycle, and an instruction address will be provided to DC 216 one System Clock (SYSCLK) period after the first edge of CPUC. If no operand read or write is pending, the instruction address will be provided to DC 216 at the first edge of CPUC, that is, at the start of the CPU period.

Considering first the reading and writing of operands, in an operand read wherein the operand is encached in DC 216, or in an operand write, the operand will appear on DB Bus 202 upon the next SYSCLK after the address and will be latched into, respectively, CPU 122, FPU 128 or DC 216 upon the next occurring first edge of CPUC, that is, the CPUC edge starting the next CPU cycle. In the case of an operand read wherein the operand is not encached in DC 216 and must be fetched from MM 106, the operand will appear on DB Bus 202 some multiple of SYSCLKs after the address and will again be latched into CPU 122 or FPU 128 upon the next occurring first edge of CPUC, that is, at the start of the next occurring CPU cycle.

That is, in any CPU cycle wherein an operand read or write is to be performed, the operand address will be provided to DC 216 on the edge of CPUC starting that CPU cycle, the operand will appear on DB Bus 202 one or more SYSCLKs after the start of that CPUC, and will be latched into its destination, either CPU 122, FPU 128 or DC 216, upon the next occurring edge of CPUC which starts a CPU cycle.

In the fetching of instructions, the addressed instruction will normally appear on DB Bus 202 one SYSCLK period after the address, will be latched into IL 204 upon the next occurring second, or falling, edge of CPUC, and will be loaded into IQ 206 upon the next occurring edge of CPUC which starts a CPU cycle if IQ 206 has space to receive the instruction. If IQ 206 is not able to receive the instruction, the instruction will be held in IL 204 until a first edge of CPUC occurs wherein space is available in IQ 206 to receive the instruction.

Considering now the roles of PAR 222, PIAR 220 and IL 204 in the above described operations, it should first be noted that the provision of PAR 222 and PIAR 220 facilitate and make possible the fetching of both an instruction and an operand in a single CPU cycles. That is, the reading or writing of an operand and the reading of an instruction from DC 216 within a CPU cycle requires that DC 216 be provided with two addresses, one for an instruction and one for an operand, within this period.

As previously described, ATU 218 provides two address streams, that is, a stream of instruction addresses from PIAR 220 and a stream of operand read/write addresses from PAR 222. PIAR 220 and PAR 222 are alternately read and either incremented or loaded with new addresses, with one being read while the other is being incremented or loaded. PIAR 220 and PAR 222 are therefore together able to provide one address to DC 216 every CPU 122 clock period, the addresses being alternately instruction addresses and operand read/write addresses.

Considering now the role of IL 204, it should first be noted that CPU 122 will not, by the nature of its operations, request the reading of an operand from DC 216 until CPU 122 is ready to receive the operand. That is, CPU 122 will not receive an operand unless CPU 122 has room in its input buffer to receive the operand. CPU 122 is therefore capable of always moving operands off of DB Bus 202 as soon as they appear thereon, so that DB Bus 202 will always be free to carry the instruction which normally appears thereon in the next SYSCLK period.

In the case of instructions, however, while a new instruction is fetched at every CPU cycle, the instructions do not progress through IQ 202 at an even rate. As such, it is possible that in any given CPU cycle there will not be space in IQ 202 to receive the newly fetched instruction. The provision of IL 204, however, allows fetched instructions to be moved off of DB Bus 202 and saved in IL 204 until space is available in IQ 202, thereby freeing DB Bus 202 for the possible appearance of a next operand.

Referring now to FPU 128, as will be described further below FPU 128 read and writes operands and data and receives instruction dispatch addresses in a manner similar to CPU 122. That is, floating point operands are received from DB 202 and data writhen to DB 202 in the same manner as in CPU 122, with the exception that FPU 128 operand/data reads and writes are directed by CPU 122 rather then by FPU 128 independently. FPU 128 also receives instruction dispatch addresses from AGU 124 in a manner similar to CPU 122, that is, from AGU 124's instruction queue and decoding mechanism.

It should be noted that the above described instruction fetching and decoding operation is, together with the detailed structures and operations of CPU 122, AGU 124, ATU/C 126 and MS 226, described in yet further detail in related U.S. patent application No. 730,977, filed May 6, 1985 and assigned to the assignee of the present patent application. As such, the appropriate descriptive portions of U.S. patent application No. 730,977 are incorporated herein by reference.

Having described the general structure and operation of PU 104, and in particular those portions and operations of PU 104 relevant to FPU 128, FPU 128 will be described in detail next below.

D. Floating Point Unit (FPU) 128 (FIGS. 3A and 3B)

As will be described in further detail below, the major functional elements of FPU 128 include a floating point arithmetic processor for performing floating point arithmetic operations and a floating point control unit for controlling operation of the floating point arithmetic processor. These elements will be described next below, and in the order mentioned.

Figure 3A:
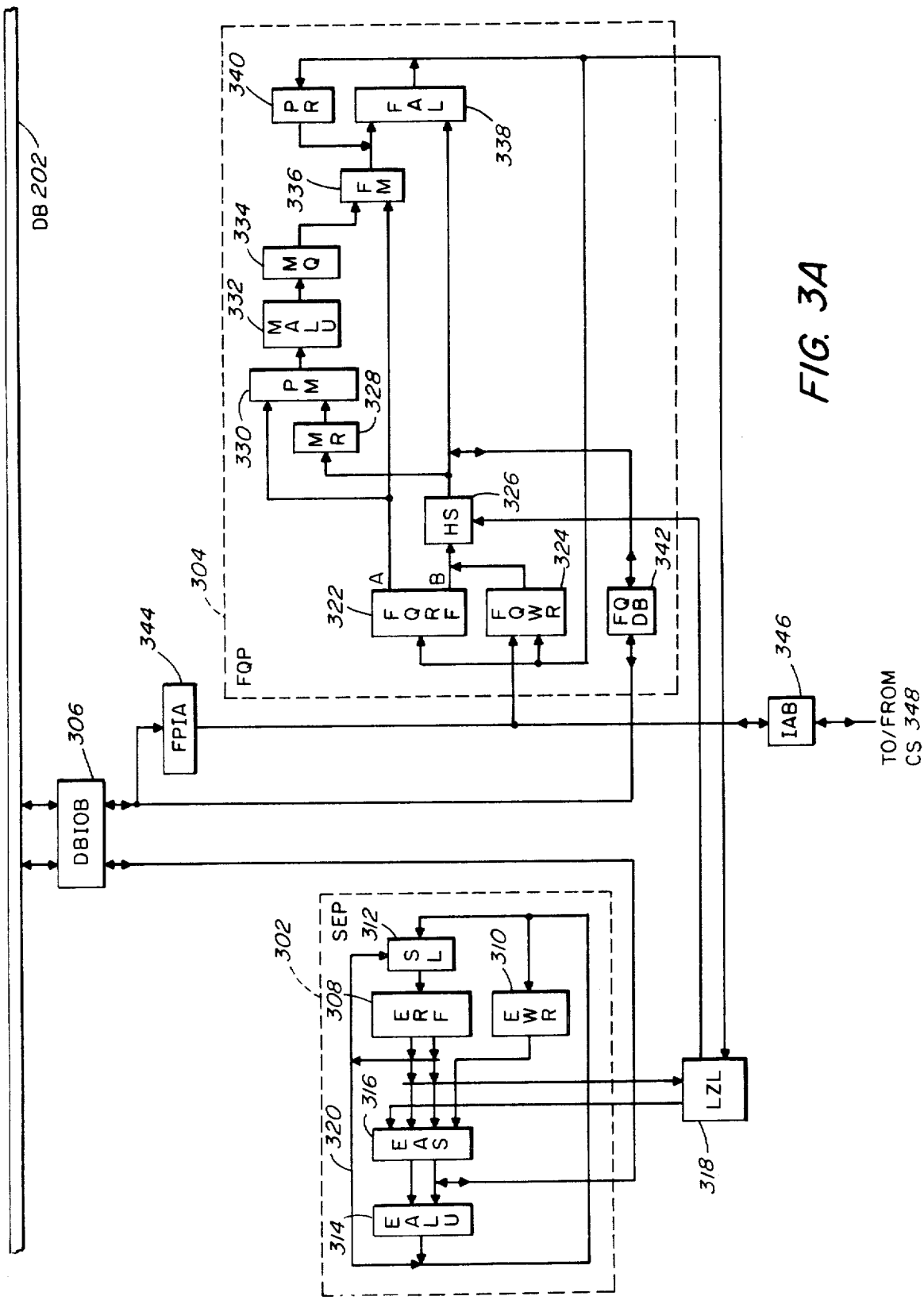
FIG. 3A is a block diagram illustrating a floating point unit arithmetic processor.

D.1 Floating Point Arithmetic Processor (FIG. 3A)

With respect to the following descriptions of FPU 128, it should be noted that the floating point arithmetic processor described herein is generally of a design whose elements and operation will be familiar to those of ordinary skill in the art and that the specific design implemented herein is not determinative of the present invention. That is, the present invention may be used with other designs and implementations of floating point arithmetic processors. As such, the floating point processor will not be described in exhaustive detail, but will be described in such detail as necessary to illustrate a typical operating environment for the present invention to those of ordinary skill in the art.

Referring to FIG. 3A, therein is presented a block diagram illustrating the overall structure and operation of FPU 128's arithmetic processor. As shown therein, FPU 128's arithmetic processor includes a Sign/Exponent Processor (SEP) 302 for performing sign and exponent related operations and a Fraction/Quotient Processor (FQP) 304 for performing mantissa related operations. SEP 302 and FQP 304 each have a bidirectional input/output port connected directly to DB Bus 202 through Data Bus I/0 Buffer 306 for receiving and writing floating point operands, that is, respectively, the exponent and mantissa fields of floating point operands.

D.1.a Sign-Exponent Processor (SEP) 302 (FIG. 3A)

Referring first to SEP 302, as described below SEP 302 performs sign/exponent related operations required for floating point arithmetic operations. As is well known in the art, these operations include the elimination of leading zeros in mantissa fields, the equalization of exponent fields and the determination of result signs. In the elimination of leading zeros from mantissa fields, for example, leading zeros appearing in the mantissa fields are detected, the mantissa fields shifted to eliminate the leading zeros, and the exponent fields adjusted accordingly. In the equalization of exponents, the exponent fields are compared and one or the other mantissa fields shifted by the difference of their exponents, thereby effectively equalizing their exponents. In result sign determination, the magnitudes of the operands are compared in view of the operation to be performed in order to determine the sign of the operation result.

As shown in FIG. 3A, SEP 302 includes an Exponent/Sign Register File (ERF) 308 and an associated Exponent Working Register (EWR) 310 for storing, in part, the sign-exponent fields of floating point operands. As will be described below, FQP 304 includes a register structure which is parallel and similar to ERF 308 and EWR 310 for mantissa related operations.

ERF 308 is comprised of 16 eight bit registers for storing, as described, the sign-exponent fields of floating point operands. In this regard, it should be noted that the information contained in each ERF 308 register is comprised of a 7 bit exponent field and a 1 bit sign field. Of the 16 registers in ERF 308, 4 are presently intended for use as floating point registers, 6 for microcode and diagnostic use, 4 to store defined constants, and 2 which are not presently used. As indicated, ERF 308 provides two output ports, so that the contents of any two ERF 308 registers can be read at any time, and has a single input connected from Sign Logic (SL) 312. As described above, and as described further below, SL 312 performs logical operations with respect to operand/result signs and provides a data path into ERF 308 from SEP 302's Exponent Arithmetic and Logic Unit (EALU) 314.

EWR 310 is a single 8 bit register for temporary storage of 8 bit exponent fields currently being operated upon. As shown, EWR 310 has a single output port and a single input port.

The two outputs of ERF 308 and the output of EWR 310 are connected to inputs of Exponent Arithmetic Selector (EAS) 316, which in turn selects and provides inputs to SEP 302's Exponent Arithmetic and Logic Unit (EALU) 314. A third input of EAS 316 is provided from Leading Zero Logic (LZL) 318.

As described further below, LZL 318 performs logical operations with respect to shift operations performed upon floating point operand mantissa and exponent fields to eliminate leading zeros appearing in the mantissa fields thereof. As shown in FIG. 3A, LZL 318 has an input connected from FQP 304's Arithmetic and Logic Unit (ALU), described below, to detect and register the numbers of leading zeros appearing in mantissa fields passing through FQP 304's ALU during each cycle of a floating point operation. As also shown, LZL 318 has further inputs connected from the outputs of ERF 308 to receive the exponent fields of corresponding exponent fields. As is well known in the art, LZL 318 operates with respect to these mantissa field leading zeros and corresponding exponent field inputs to provide outputs to EAS 316 which are used in minimization of mantissa field leading zeros.

Returning to EAS 316, as shown in FIG. 3A EAS 316 provides two outputs to EALU 314 for arithmetic and logic operations. As described above, these outputs may include sign-exponent fields or defined constants from ERF 308 or EWR 310, or microcode diagnostic fields, and outputs from LZL 318 used in adjusting exponents in mantissa leading zero reduction. EALU 314 performs arithmetic and logic operations upon these inputs and the output of EALU 316 is in turn connected to the input of EWR 310 and to an input of SL 312, thereby providing, as describe above, a data path from the output of EALU 314 and to the input of ERF 316 through SL 312.

Two further data paths should be noted in SEP 302, the first being associated with ERF 308 and the second being the path between SEP 302 and DBIOB 306, that is, DB 202. With regard to the first, the two output ports of ERF 308 are multiplexed onto a single ERF Bus 320, which in turn is connected to an input of SL 312 and to the output of EALU 314. The ERF Bus 320 input to SL 312 is used in result sign determination operations. The ERF Bus 320 connection to the output of EALU 314 allows the contents of a selected ERF 308 register to be read to the input of EWR 310 and the associated input of SL 312, thereby providing a data path, through SL 312, from the output ports of ERF 308 to the input of ERF 308.

With regard to the input/output data path between DB 202 and SEP 302, it is shown in FIG. 3A that a bidirectional data path is connected from DB 202 and through DBIOB 306 to the bus connecting an EAS 316 output port to the corresponding EALU 314 input port. As such, the output data path from SEP 302 to DB 202 is comprised of a path from the output ports of ERF 308 and EWR 310 and through EAS 316 to DBIOB 306 and DB 202.

SEP 302's input data path, in turn, is effectively from DB 202 and DBIOB 306 to the above described input port of of EALU 314. In this regard, EALU 314 is operating as a data path to pass data directly through EALU 314 from its input to its output, rather than performing an arithmetic or logical operation. The data from DB 202 appearing on EALU 314's output may then, as described above, be read into EWR 310 or through SL 312 and into an ERF 308 register.

D.1.b Fraction/Quotient Processor (FQP) 304 (FIG. 3A)

Referring again to FIG. 3A, therein is further presented a block diagram of FPU 128's Fraction/Quotient Processor (FQP) 304 for performing operations upon the mantissa fields of floating point operands in conjunction with the operations of SEP 302. As described below, these operations include addition, subtraction, multiplication and division of mantissas.

Again, because the floating point arithmetic processor described herein is generally of a design whose elements and operation will be familiar to those of ordinary skill in the art, FQP 304 will not be described in exhaustive detail. FQP 304 will, however, be described in such detail as necessary to illustrate a typical operating environment for the present invention to those of ordinary skill in the art.

Considering first the general arithmetic operations performed upon floating point operand mantissa fields by FQP 304, it was described above that the general operations performed by SPU 128 include the addition, subtraction, multiplication and division of floating point numbers. Of these operations, addition and subtraction are performed in a generally similar manner. That is, the exponents are compared by SEP 302 to determine any difference therebetween. If there is a difference between exponents the exponents must be equalized by shifting, that is, effectively multiplying or dividing, one mantissa so that that operands exponent becomes equal to the other operand's exponent. In the present implementation, the smaller number is shifted, thereby preserving the maximum accuracy in the calculation. The two operands, that is, mantissas, are then added or subtracted with the actual operation and the sign of the result being determined by the combination of the signs and magnitudes of the two operands and the specified arithmetic operation.

Multiplications are performed by addition of the operand exponents by SEP 302 and repetitive fractional multiply and add operations upon the mantissas by FQP 304, one mantissa being designated as the multiplicand and the other as the multiplier. In each fractional multiply and add operation, the multiplicand is multiplied by the multiplier to generate a sub-product and the resulting sub-product added to the sum of previous sub-products until the multiplication is completed. In this regard, it should be noted that FQP 304 uses multiplication tables contained in PROMs to execute 8 bit by 56 bit multiplies wherein the 56 bit input is the multiplicand mantissa and the 8 bit input is the current fraction of the multiplier mantissa. Selection of successive multiplier mantissa fractions is performed by successive 8 bit right shifts of the multiplier mantissa with the present right-most 8 bits being the present multiplier fraction.

Divisions are performed by subtraction of the exponents by SEP 302 and repetitive fractional subtractions or additions of the mantissas by FQP 304. In each fractional subtraction or addition, the divisor is subtracted from or added with a divisor which is a partial remainder generated in the previous operation. The result is then left shifted by one bit to generate a new partial remainder for the next fractional operation, and a new quotient bit which is left shifted into the running quotient in MQ 334.

Referring now again to FIG. 3A, FQP 304 is shown as including a Fraction/Quotient Register File (FQRF) 322 and associated Fraction/Quotient Working Register (FQWR) 324 which, as described above, are similar to and parallel in structure and operation to ERF 308 and EWR 310. Again, FQRF 322 provides two output ports, designated A and B, so that two mantissas may be read from the registers therein at a time while FQWR 324, which includes a single register, has a single output port. It should be noted that while the mantissa fields in the present implementation of FPU 128 are 56 bits wide, MQ 334 is 64 bits wide to hold the partial products resulting from 8×56 bit multiplications.

Associated with FQRF 322 and FQWR 324 is a Hex Shifter (HS) 426 which, as shown, is connected from the output port of FQWR 324 and FQRF 322's B output port. HS 326 operates under control of LZL 318 to perform the mantissa shift operations involved in exponent equalization in addition and subtraction operations.

The A output port of FQRF 322 and the output of HS 326 are provided as inputs to FQP 304's arithmetic and logic processor elements. Considering these elements in the sequence in which data flows through the arithmetic and logic processor, the output of HS 326 is connected into a 56 bit Multiplier Fraction Register (MR) 328. MR 328 operates under control of a multiply command to shift the contents of MR 328 right by 8 bits, while filling the undefined bits, to generate multiplier fractions in multiply operations.

The output of MR 328 and the A output port of FQRF 322 are connected in parallel to inputs of PROM Multiplier (PM) 330. As described above, PM 330 is comprised of PROM multiply tables performing 8×56 multiply operations on the inputs thereto. The output(s) of PM 330 are provided to a Multiplier Arithmetic and Logic Unit (MALU) 332, which is comprised of two carry-save-add units followed by a carry-look-ahead-add unit and which operates in conjunction with PM 330 to perform the multiply operation.

As described, the primary function of MR 328, PM 330 and MALU 334 is to perform multiplication operations and, in particular, to generate successive sub-products in multiplication operations. The multiplicand, of 56 bits, is provided from FQRF 322's A port while the 8 bit multiplier is provided from MR 328 which, as described, accepts a 56 bit multiplier from FQRF 322's B port through HS 326 and generates 8 bit multipliers by successive 8 bit right shifting.

The output of MALU 332 is connected into a Multiply Quotient Register (MQ) 334, which stores 64 bits of a 8×56 multiplication, such as a current sub-product in a multiply operation. MQ 334 also operates as the quotient register in divide operations.

The remaining major elements of FQP 304, comprising Fraction Multiplexer (FM) 336, Fraction Arithmetic and Logic Unit (FAL) 338 and Partial Remainder Register (PR) 340 together operate as a general purpose arithmetic unit for performing mantissa add, subtract, multiply and divide operations. As shown, the output of MQ 334 and the A output port of FQRF 322 are connected into the inputs of FM 336. The output of FM 336 is in turn connected to a first input port of FAL 338 and FM 336 operates to select either the output of MQ 334 or the output of FQRF 322's A port as an input of FAL 338's first input port. The second input port of FAL 338 is, as shown, connected from the output of HS 326. The output of FAL 338 is connected through Partial Remainder Register (PR) 340 to the first input port of FAL 338 and to input ports of FQRF 322 and FQWR 324.

Considering now the arithmetic operations to be performed upon mantissas, the mantissa shifting operations of HS 326 in equalization of exponents in add and subtract operations was previously described. In the actual addition and subtraction of the mantissas, one mantissa will be provided to FAL 338 from FQRF 322's A port and through FM 336 to the first input port of FAL 338. The second mantissa will be provided from FQRF 322's B port, shifted as necessary through HS 326 and provided to FAL 338's second input port. FAL 338 will then perform the necessary addition or subtraction of the mantissas as previously described and may write the result back into FQRF 322 or FQWR 324 as required.

In a multiplication, a current sub-product is, as described above, generated through MR 328, PM 330 and MALU 332 and stored in MQ 334. The current sub-product is then selected through FM 336 and provided to FAL 338's first input port. The current partial product, that is, the sum of previous sub-products, is stored in FQRF 322 and is read from FQRF 322's B port and through HS 326 to FAL 338's second input port. FAL 338 performs the addition of the sub-product and partial product and writes the result back into FQRF 322 to be the new partial product.

Division is performed using a non-restoring algorithm, that is, by repetitive addition and subtraction of a divisor to or from a dividend, depending upon the quotient bit of the previous step. In a division, the initial dividend is stored in FQRF 322 and is read from FQRF 322's A port to FAL 338's first input port through FM 336. The divisor is also stored in FQRF 322 and is read from FQRF 322's B port to FAL 338's second input port. The dividend may be right shifted by 4 bits and is guaranteed to be smaller than the divisor. In this regard, it should be noted that the first operation is always a subtraction, while subsequent operations may be subtractions or additions. FAL 338 then subtracts the divisor from the dividend and the result is left shifted by one bit through PR 340 to generate a new partial remainder to be the dividend for the next fractional subtraction. The new partial remainder is then provided to FAL 338's first input port from PR 340 while the divisor is again provided to FAL 338's second input port from FQRF 332 and a quotient bit is shifted left into MQ 334. This process is repeated for each subsequent fractional subtraction until the division operation is completed.

Finally, FQP 304 includes, as previously described, and input/output data path directly to DB 202. As will be described below, FQP 304's I/O path further includes an element of FPU 128's control unit. Referring first to FQP 304's I/O path, as shown in FIG. 3A FQP 304 includes a bidirectional Fraction/Quotient Data Buffer (FQDB) which is connected between the output of HS 326, that is, FQRF 322's B output port, and bidirectional DBIOB 306. As previously described, DBIOB 306 is in turn bidirectionally connected from SB 202.

Data, that is, floating point operand mantissa fields, may be read from FQRF 322 through FQRF 322's B output port and to DB 202 through the path comprising HS 326, FQDB 342 and DBIOB 306. Data may be read into FQRF 322 from DB 202 through the path comprising DBIOB 306, FQDB 342, FAL 338 and the input port of FQRF 322. In this case, FAL 338 is operating as a data throughput path, rather than performing an arithmetic or logic function.

Referring now to those elements of FPU 128's control unit residing with SEP 302 and FQP 324, as previously described FPU 128 operates in parallel with CPU 122 to execute floating point instructions appearing in the instruction stream. In essence, floating point instructions appearing in the instruction stream, and their associated operands, are fetched from ATU/C 126 in the same manner as non-floating point instructions but, rather than being transferred into and executed by CPU 122, are loaded into and executed by FPU 128. Floating point and non-floating point operations may thereby be executed in parallel in that CPU 122 is freed to proceed with the execution of at least certain non-floating point instructions without having to wait for the completion of floating point instructions.

As also previously described, FPU 128 is not provided with an instruction/operand fetch mechanism, except for its internal registers, and does not have access, in itself, to either MM 106 or the instructions and operands encached in DC 216. CPU 122, operating in conjunction with AGU 124 and ATU/C 126, performs all instruction and operand fetch operands and all data writes for FPU 128.

For these reasons, the instruction address of a floating point instruction being executed by FPU 128 may differ from that of an instruction concurrently being executed by CPU 122. When, for example, an exception condition condition occurs in FPU 128, such as an overflow, FPU 128 must report the address of the floating point instruction for which that condition occurred. Therefore, because the floating point instruction addresses may not be available in CPU 122, FPU 128 must save all such floating point instruction addresses.

This floating point instruction save facility is provided through Floating Point Instruction Address Register (FPIA) 344. As shown, FPIA 344 is connected from DB 202 through DBIOB 306 to capture and store all floating point instruction addresses. In the present embodiment, FPIA 344 is comprised of a latch followed by a register and provides up to two stages of instruction address storage. For example, FPIA 344's register may be used to store the address of the instruction currently being executed by FPU 128 and FPIA 344's latch may be used to capture and temporarily store the address of a next instruction which is stored in FPU 128's IQ 356. The address captured in FPIA 344's latch would then be transferred into FPIA 344's register when execution of the previous instruction ends and that of the instruction in IQ 356 begins.

The output of FPIA 344 is provided to FPU 128's control unit, described below, through bidirectional Instruction Address Buffer (IAB) 346 and to a second input of FQWR 324. FQWR 324, together with HS 326, FQDB 342 and DBIOB 306 provide a path through which a captured and stored floating point instruction address may be read back onto DB 202.

IAB 346 provides a path by which a current floating point instruction address may be provided to FPU 128's control unit. In addition, and as described further below, IAB 346 provides a path through which floating point microcode may be written from DB 202 and into FPU 128's control store, described below, and read from FPU 128's control store to DB 202. The microcode write path is comprised of DB 202, FPIA 344 and IAB 346 while the read path is comprised of IAB 346, FQWR 324, HS 326, FQDB 342 and DBIOB 306.

Having described the general structure and operation of FPU 128's floating point arithmetic unit, FPU 128's floating point control unit will be described next below.

D.2 The Floating Point Control Unit (FIG. 3B)

Referring to FIG. 3B, therein is represented a block diagram of FPU 128's control unit, which, as previously described, provides microcode control of FPU 128. As previously described, FPU 128's control unit controls operand/data reads and writes as directed by CPU 122 and executes floating point operations under direction of instructions dispatched from AGU 124 in a manner similar to CPU 122, that is, from AGU 124's instruction queue and decoding mechanism. As the operation and design of such control units is well known to those of ordinary skill in the art, FPU 128's control unit will not be described in exhaustive detail, but will be described in such detail as necessary to illustrate a typical operating environment for the present invention to those of ordinary skill in the art.

As shown in FIG. 3A, FPU 128's control unit includes a Control Store (CS) 348 for storing and providing microcode routines for directing operation of FPU 128. In the present implementation, CS 348 is comprised of a ROM (Read-Only-Memory) section for storing, for example, power-up diagnostic routines, and a RAM (Random-Access-Memory) section for storing the operational microcode. As will be described below CS 348 is provided with a data read/write path from DB 202 whereby CS 348 may be loaded with operational microcode.

The output of CS 348 is as shown, connected to the input of Microinstruction Register (MIR) 350, which captures and holds a current microinstruction. The output of MIR 350, which comprises the bits comprising a current microinstruction. is provided to the remaining portions of FPU 128, such as SEP 302, FQP 304 and FPU 128's control logic interface to CPU 122, to control the operations of FPU 128.

The output of CS 348 is further connected to IAB 346, thereby forming a path through which the contents of CS 348 may be read to DB 202. As will be described below, this connection to IAB 346 also comprises a part of the path through which microcode may be written into CS 348. Finally, the output of CS 348 is provided to Page Number Register (PN) 352 which receives and stores the page number of the microcode routine currently being executed by FPU 128.

As previously described, instructions directing the execution of floating point operations are dispatched from AGU 124, that is, from IRO 208, in the form of instruction addresses which essentially point to the start of corresponding microinstruction sequences in CS 348. As shown in FIG. 3B, this input from AGU 124's IRO 208 is provided as a first input to Instruction Address Select Multiplexer (IAS) 354. As described below, IAS 354 operates to select and provide CS 348 microcode routine starting addresses from a plurality of sources, including IRO 208. It should be noted that there is an alternate dispatch path from BD 202, that is, certain bits appearing on DB 202 may be used as a dispatch address or as a part of a dispatch address.

Associated with FPU 128's instruction dispatch input from IRO 208 is a one stage instruction queue (IQ) 356 which allows FPU 128 to receive and store one floating point instruction in advance of the instruction currently being executed. As shown, the input of IQ 356 is connected from and parallel to IAS 354's input from IRO 208 and the output of IQ 356 is connected to a second input of IAS 354.

Finally, a third input of IAS 354 is connected from the output of PN 352 which, as described above, stores the page number of the microcode routine currently being executed by FPU 128. A fourth input is connected from the output of MIR 350 which, as also described above, holds a current microinstruction.

The above described inputs to IAS 354 are provided therethrough to the input of Address Sequence Controller (ASC) 358. ASC 358 is in turn responsive to these inputs, which include the microinstruction currently being executed, to select the sequential microinstructions required to execute a current operation. ASC 358 may include. for example, an Advanced Micro Devices 2911A sequence controller, and the output of ASC 358, which is comprised of microinstruction addresses in CS 348, is provided as the address input of CS 348. As shown, the output of ASC 358 is also provided to PN 352 for use in selecting a new page number.

Having described the overall structure and operation of FPU 128's arithmetic and control units, FPU 128's interface with CPU 122 will be described next below. In this regard, it should be noted that FPU 128's interface structure to CPU 122 is primarily implemented in logic gating which is peculiar to the particular present design and that this interface gating may be implemented in many other ways by those of ordinary skill in the art. As such, the structure and operation of FPU 128's interface with CPU 122 will be best understood by those of ordinary skill in the art through a description of the signals interchanged therebetween and the logical operations performed as a result of those signals. As such, the particular logic used in the present implementation will not be described in detail. The interface signals and logical operations resulting from and performed by those signals will, however, be described in detail so as to adequately disclose the present invention to those of ordinary skill in the art.

E. FPU 128/CPU 122 Interface (FIGS. 3B, 4A and 4B)

The following will first describe the general operation of the CPU 122/FPU 128 interface and will then described the signals and logical operation thereof in detail. In this regard, it should be remembered that, as described above, FPU 128 operates in parallel with CPU 122 to execute floating point instructions appearing in the instruction stream. In essence, floating point instructions appearing in the instruction stream, and their associated operands, are fetched from ATU/C 126 in the same manner as non-floating point instructions but, rather than being transferred into and executed by CPU 122. are loaded into and executed by FPU 128. Floating point and non-floating point operations may thereby be executed in parallel in that CPU 122 is freed to proceed with the execution of at least certain non-floating point instructions without having to wait for the completion of floating point instructions.

Further in this regard, and as also described above, FPU 128 is not provided with an instruction/operand fetch mechansm and does not have access, in itself, to either MM 106 or the instructions and operands encached in DC 216. CPU 122, operating in conjunction with AGU 124 and ATU/C 126, performs all instruction and operand fetch operands and all data writes for FPU 128. FPU 128 thereby performs all operand/data reads and writes and executes all floating point operations under direction of instructions dispatched from AGU 124 and in response to control signals provided to FPU 128 through FPU 128's interface to CPU 122. As will also be described, the coordination of CPU 122's operations with FPU 128 is also controlled through control signals provided to CPU 122 from FPU 128 through FPU 128's interface to CPU 122.

E.1 General Execution of Floating Point Operations (FIGS. 4A and 4B)

As previously described, the FPU 128 of the present invention provides an increase in the speed of operation of CPU 122 by requiring the operations of CPU 122 and FPU 128 to be synchronized only when an operation requires coordinated and cooperative operation on the part of both CPU 122 and FPU 128. For example, a given floating point operation may require that the operands be read from MM 106 to FPU 128 at the start of the operation or that the operand resulting from a floating point operation be written back into MM 106 at the end of the floating point operation. As described above, all transfers of data to and from FPU 128 are through DB 202 and are controlled by CPU 122. As such, these operations require the cooperation and synchronization of CPU 122 and FPU 128. In alternate example, the source and destination of the operands may be entirely within FPU 128, that is, in ERF 308 and FQRF 322. In this case, CPU 122 needs only to pass the operation code to FPU 128 and FPU 128 may proceed to execute the operation independently of CPU 122, wherein CPU 122 is freed to execute other operations while FPU 128 is executing the floating point operation. Further attention to FPU 128 by CPU 122 will then be required only after FPU 128 has completed the operation and the results are to be read back to DB 202.

As a result of this basic operation, that is, that CPU 122 and FPU 128 are synchronized in their operation only when necessary, the operation of CPU 122 and FPU 128 and their interface is dependent upon the type of operation to be executed. For this reason, all instructions are divided into four types, with the operation of CPU 122 and FPU 128 being dependent upon the type into which an instruction falls.

As will be described below, the type of an instruction depends upon whether the instruction is (a) a floating point instruction not requiring interlock of operation between FPU 128 and CPU 122; (b) a floating point instruction requiring interlock of operation between FPU 128 and CPU 122; (c) a non-floating point instruction requiring interlock of operation between FPU 128 and CPU 122; or (d) an instruction which is not an (a) or (b) or (c) type of instruction, that is, an instruction which is not a floating point instruction and which does not require interlock of operation between FPU 128 and CPU 122.

It is apparent from the above definitions of instruction types that the types are distinguished by two characteristics. The first characteristic is whether or not an instruction is a Floating Point Instruction (FPUINST), that is, whether the instruction does or does not require the execution of a floating point arithmetic operation. The second characteristic is whether or not an instruction is a Floating Point Lock (FPULOCK) instruction, that is, whether the instruction requires or does not require the interlocking of the operations of FPU 128 and CPU 122.

Considering in further detail the four instruction types, the four types defined in the present implementation include, in the order defined above:

Type (a): FPUINST/Not FPULOCK Instructions

This type includes all instructions whose execution requires arithmetic operations to be performed by FPU 128.

Examples of FPUINST operations include all register to register floating point operations, that is, all floating point operations which are executed entirely within FPU 128 rather than requiring the transfer of data into or out of FPU 128.

A further example of Type (a) instructions include those floating point operation instructions which may result in an FPU 128 exception condition, such as an overflow, underflow or divide by zero. As will be described below, in such cases CPU 122 sends the instruction address through DB 202 to FPU 128 wherein, as described above, the instruction address is stored in FPIA 344; if an FPL 128 exception conditions occurs, FPU 128 will, at the request of CPU 122, return the instruction address and an identification of the exception to CPU 122 through DB 202.

Type (b): FPUINST/FPULOCK Instructions

This type includes all instructions which require both arithmetic operations by FPU 128 (FPUINST) and the interlock of operation between FPU 128 and CPU 122 (FPULOCK).

These instructions essentially include all floating point operation instructions which require data to be written to or read from FPU 128, that is, all floating point arithmetic operations wherein data is transferred into or out of FPU 128 under the control of CPU 122. Such operations would include operations wherein data is transferred from MM 106 to FPU 128 or data stored back into MM 106 from FPU 128. As previously described, FPU 128 is not provided with an instruction/operand fetch mechanism and does not have access, in itself, to either MM 106 or the instructions and operands encached in DC 216. CPU 122, operating in conjunction with AGU 124 and ATU/C 126, performs all instruction and operand fetch operands and all data writes for FPU 128. These operations thereby require the interlocking of FPU 128 and CPU 122 and are thereby within the FPULOCK class of instructions.

A further example of Type (b) instructions again includes those instructions which may result in an FPU 128 exception condition, such as an overflow, underflow or divide by zero. As will be described below, in such cases CPU 122 sends the instruction address through DB 202 to FPU 128 wherein, as described above, the instruction address is stored in FPIA 344; if an FPU 128 exception conditions occurs, FPU 128 will, at the request of CPU 122, return the instruction address and an identification of the exception to CPU 122 through DB 202.

It should be further noted that, as described further below, FPU 128 must either be or will be in an Idle state when CPU 122 dispatches a Type (b) instruction and that, as also described further below, FPU 128's and CPU 122's internal clocks will be synchronized when transferring data between CPU 122 and FPU 128 during execution of these instructions.

(c) Type (c): Not FPUINST/FPULOCK Instructions

These instructions include all instructions which require the interlock of FPU 128 and CPU 122 (FPULOCK) but which do not involve the execution of an arithmetic operation by FPU 128 (not FPUINST).

Examples of Type (c) instructions essentially include all operations wherein the flow of program control and execution is affected by the state or the operation of FPU 128 or will change the program environment on CPU 122. Examples of such instructions include instructions or operations involving calls, returns, and branches and instructions which read, write or depend upon the state of the Program Control Word maintained by CPU 122.

It should be noted that, as is apparent from the above descriptions of Type (b) and (c) instructions, Type (b) and (c) instructions are similar in requiring the transfer of information between FPU 128 and CPU 122 and thus in requiring interlock between FPU 128 and CPU 122.

Type (d): Not FPUINST/Not FPULOCK Instructions

Type (d) instructions essentially include all instructions which do not involve FPU 128 in any manner, that is, are neither FPUINST nor FPULOCK instructions.

In this case, CPU 122 can execute in parallel with FPU 128 disregarding the state of FPU 128.

As is apparent from the above descriptions of the four types of instruction, these four types of instruction fall into two groups which are of interest with respect to FPU 128 operations, the first group being comprised of Types (b) and (c) and the second group being comprised of Type (a). The common characteristic of instruction Types (b) and (c) is that both types of instruction require the interlock of operation between FPU 128 and CPU 122, that is, are FPULOCK instructions. Type (a) instructions are similar to Type (b) instructions in requiring arithmetic operations by FPU 128, that is, are FPUINST instructions, but are distinguished in that interlock of operation between FPU 128 and CPU 122 is not required. The Type (a) instructions are distinguished from Type (c) instructions in that Type (c) instructions are not FPUINST instructions.

Because of this grouping of the types of instructions by their characteristics, and as described further below, the mutual operation of FPU 128 and CPU 122 is dependent upon the group in which instructions fall. That is, whether in the first group comprising Types (b) and (c) or in the second group comprised of Type (a). As described above, the common characteristic of instruction Types (b) and (c) is that they require interlock of FPU 128 and CPU 122, that is, are FPULOCK instructions. For this reason, the first group is hereafter referred to as the FPULOCK instructions. Similarly, the second group of instructions. comprised of Type (a) instructions, is hereafter referred to as the FPUINST group of instructions.

Referring to FIGS. 4A and 4B, therein are represented timing diagrams illustrating the operation of FPU 128 and CPU 122 in the cases of, respectively, FPULOCK and FPUINST instructions. Considering first FIG. 4A and FPULOCK instructions, as previously described FPULOCK instructions require that CPU 122 wait until FPU 128 is in an Idle state, that is, FPU 128's instruction queue (IQ 356) is empty and FPU 128 not executing a floating point instruction, before dispatching a FPULOCK instruction. CPU 122 is put into a waiting state by means of a dispatch exception if CPU 122 attempts to dispatch an FPULOCK instruction if FPU 128 is not in an Idle state or will not be in an Idle state in the next microcode cycle. Further, if the FPULOCK instruction requires a transfer of data between FPU 128 and CPU 122, FPU 128's internal clock must be synchronized with CPU 122's internal clock.

It should be noted that the operations of FPU 128 and CPU 122 are represented in FIGS. 4A and 4B as being in synchronization, that is, as if FPU 128's and CPU 122's internal clocks were synchronized. This representation is used for clarity and ease of description as, in actual operation, the internal clocks and operations of FPU 128 and CPU 122 may be offset by, for example, a half a half a clock cycle. If, as described above, the dispatched instruction requires that FPU 128 and CPU 122 be synchronized in their operations, this synchronization will be performed through the interface signals described below and the operational cycles of FPU 128 and CPU 122 will be in synchronization as represented in FIGS. 4A and 4B.

Referring to FIG. 4A, therein are represented five successive microcode cycles wherein CPU 122 is dispatching an FPULOCK instruction. In period 1, FPU 128 is completing the execution (exec) of an Instruction 0 (InstO) and is dispatching an Instruction 1 (Instl). Instl is the next floating point instruction and is being held in IQ 356 (Q Instl) . CPU 122 attempts to dispatch an FPULOCK instruction (DISP) and. because FPU 128 is not in an IDLE state, takes a dispatch exception (dispX) and Waits. In period 2, FPU 128 is executing Instl and, again because FPU 128 is not in an Idle state, CPU 122 again takes a dispX and Waits. In period 3, FPU 128 is completing the execution of Instl and thus will be in an Idle state in the next microcode cycle. CPU 122 is thereby able to and does dispatch an Instruction 2 (Inst2) , which is the next floating point instruction. Because FPU 128 does not have an instruction in IQ 356, FPU 128 immediately dispatches Inst2 (DISP Inst2) at the start of period 3 and begins execution of Inst2 (exec Inst2) in period 4.

Referring to FIG. 4B, therein are represented five successive microcode cycles wherein CPU 122 is dispatching an non-FPULOCK/FPUINST instruction. As previously described, FPUINST instructions require only that FPU 128's instruction queue (IQ 356) be empty before CPU 122 may dispatch a next instruction. If this condition is not met and CPU 122 attempts to dispatch a FPUINST instruction, CPU 122 will again take a dispatch exception and go into a Wait state.

In periods 1 and 2, FPU 128 is shown as executing an INSTO (exec InstO) and as having an Inst 1 enqueued in IQ 356 (Q Inst 1); CPU 122 attempts to dispatch (DISP) Inst 2 and, because FPU 126 has an enqueued instruction, takes a dispatch exception (dispX) and goes into a Wait state. In period 3, FPU 128 is completing execution of InstO (exec InstO) and therefore dispatches Instl (DISP Instl), which, as described. was enqueued in IQ 356. Because FPU 128 has dispatched Instl, FPU 128's instruction queue is not longer full and CPU 122 dispatches Inst 2 (DISP Inst2). In period 4, FPU 128 begins execution of Inst 1 (exec Instl) with Inst2 appearing in IQ 356 (Q Inst2). During this period, CPU 122 may begin execution of any operations to be performed by CPU 122 in association with the execution of Inst2 (exec Inst2) while FPU 128 is executing Instl. Having described the operation of FPU 128 and CPU 122 with respect to the dispatch and execution of floating point operations, the operation of FPU 128's and CPU 122's interface through which these operations are coordinated will be described next below.

E.2 FPU 128/CPU 122 INTERFACE (FIG. 3B)

As previously discussed, FPU 128's interface structure to CPU 122 is primarily implemented in logic gating which is peculiar to the particular present design and this interface gating may be implemented in many other ways by those of ordinary skill in the art. As such, the structure and operation of FPU 128's interface with CPU 122 will be best understood by those of ordinary skill in the art through a description of the signals interchanged therebetween and the logical operations performed as a result of those signals. As such, the particular logic used in the present implementation will not be described in detail. The interface signals and logical operations resulting from and performed by those signals will, however, be described in detail below so as to adequately disclose the present invention to those of ordinary skill in the art.

Referring to FIG. 3B, therein is again represented FPU 128's control structure, including CPU/FPU Interface Logic (CFIL) 360 and the signals interchanged therethrough by FPU 128 and CPU 122 to coordinate their operation for the three classes of instructions described above. As indicated, there are eight primary signals provided to FPU 128 by CPU 122, and in particular by CPU 122's MS 226, in this interface and four signals provided to CPU 122, that is, to MS 226, by FPU 128. These signals and their logical operations with respect to coordinating the operations of FPU 28 and CPU 122 will be described next below.

Considering first the signals provided to FPU 128 by CPU 122, among these signals are:

CLK (Clock)—A general PU 104 clock from which both FPU 128 and CPU 122 derive their individual internal clocks controlling the timing of operations therein.

BCPUCLK (Buffered CPU 122 Clock)—CPU 122's internal clock. BCPUCLK defines CPU 122's microcode cycles; that is, one BCPUCLK period is the time to execute a CPU 122 microinstruction and will vary depending upon the microinstruction. In general, the basic period of BCPUCLK is 120 ns (nanosecond) and may be extended in increments of 60 ns. BCPUCLK is used by FPU 128 to determine when a CPU 122 microcycle has ended, that is, when CPU 122 has completed execution of a microinstruction, and when FPU 128 is to load data from CPU 122 into FPU 128's registers, that is, ERF 308, EWR 310, FQRF 322 and FQWR 324.

BTRAP (Buffered TRAP)—A signal generated by CPU 122 to indicated that CPU 122 has entered a TRAP state. The CPU 122 clock will be extended by 120 ns for trap handling and all CPU 122 commands are invalidated. As will be described below, the interface signal FPUDX is gated with BTRAP, so that FPUDX is invalidated upon a CPU 122 trap condition.

EC (End Cycle)—A CPU 122 generated signal indicating the end of a CPU 122 cycle. EC is used by FPU 128 to hold FPU 128's internal clock when FPU 128 is reading data from CPU 122. For example, FPU 128 will use EC to synchronize FPU 128's internal clock to CPU 122's clock upon the assertion of FPUDX, described below, by CPU 122. FPU 128 will further respond to an EC when FPU 128 is in an Idle state, that is, will synchronize its operation to that of CPU 122 in anticipation of a next FPUINST dispatch.

FPUDX (FPU 128 Dispatch)—A signal asserted by CPU 122 to indicate to FPU 128 that CPU 122 is placing data on DB 202 for FPU 128, or that CPU 122 is looking for data from FPU 128 on DB 202 and that FPU 128 should place the data on DB 202. As described above, FPUDX is invalidated by BTRAP. It should be further noted that, as described below, interface signal FPUI cannot be asserted by CPU 122 when CPU 122 is asserting FPUDX.

FPUI (FPU 128 Instruction)—A signal asserted by CPU 122 to direct FPU 128 to obtain the next instruction dispatch information (address) from DB 202. When FPUI is asserted, FPU 128 is informed that CPU 122 is issuing a command to FPU 128. It should be noted, as described below, that CPU 122 must test interface signals FPUID and FPUAV before asserting FPUI and that the meaning and operation of FPUI is changed when CPU 12 is asserting interface signal FPUAB.

LFPUI (Load FPU 128 Instruction)—A signal asserted by AGU 124 to cause FPU 128 to accept the next dispatch information from IRO. When LFPUI is asserted, FPU 128 is informed that CPU 122 has just dispatched to an instruction which requires service by FPU 128.

FPUAB (FPU 128 Abort)—A signal asserted by CPU 122 to unlock an FPU 128 wait state, that is, when FPU 128's internal clock has been stopped to wait for completion of a data transfer with CPU 122, and to force FPU 128 to dispatch. It should be noted that when FPU 128 is in a wait state FPU 128's instruction queue is empty and a forced dispatch will put FPU 128 into the Idle state. There will be no effect upon FPU 128 operation if FPU 128 is not in a wait state. It should be further noted that, as described below, the concurrent assertion of FPUI changes the meaning and operation of FPUAB. And, LDFPIA (Load FPIA 344)—This signal is generated by the logical "ANDing" of FPUI and FPUAB and is asserted by CPU 122 to cause FPU 128 to load FPIA 344 from DB 202 with the instruction address of an instruction previously dispatched to FPU 128.

Considering now the interface signals provided from FPU 128 to CPU 122, among these signals are:

FPUID (FPU 128 Idle)—A signal generated by FPU 128 and indicating that FPU 128 is presently in an Idle state, that is, that FPU 128 is not presently executing a floating point instruction, that FPU 128's instruction queue IQ 356 is empty, and that no exceptions are present or pending in FPU 128.

FPUAV (FPU 128 Available)—A signal generated by FPU 128 and indicating that FPU 128's instruction queue IQ 356 is empty, or will be empty at the next microcycle, and that FPUXP, described below, is and will not be asserted.

FPUXP (FPU 128 Exception Pending)—A signal generated by FPU 128 and indicating that FPU 128 has detected the existence of a floating point exception condition, such as an overflow, underflow or divide by zero. And, FPCC (FPU 128 Condition Codes)—Condition codes generated by FPU 128 and provided to CPU 122 to be used as part of and in the same manner as the condition codes appearing in a Program Control Word maintained by CPU 122. The FPCCs are provided to CPU 122 by FPU 128 whenever an instruction is sent to FPU 128 which might update condition codes; CPU 122 will subsequently check the condition codes as appropriate during execution of that instruction.

The above completes the description of a presently preferred embodiment of the present invention. It should be noted that the invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. In an information processing system including memory means for storing instructions and operands, central processor means including means for fetching and decoding instructions and operands, bus means connected between the processor and memory means, and floating point means connected from the bus means and responsive to decoded floating point instructions for performing floating point operations, a method for performing floating point operations comprising the steps of:

in the central processor means
(a) determining whether a floating point instruction is a member of a first group of instructions requiring interlock of operation between the floating point means and central processor means, or a member of a second group of instructions not requiring interlock of operation between the floating point means and central processor means, and (b) if the floating point instruction is determined to be a member of the first group of instructions, then
  (1) determining when the floating point means is idle,
  (2) synchronizing operation of the floating point means to the central processor means, and
  (3) dispatching the instruction to the floating point means for execution; else (c) if the floating point instruction is determined to be a member of the second group of instructions, then
  (1) determining when the floating point means is available, and
  (2) dispatching the instruction to the floating point means for execution.

2. The method of claim 1 and further comprising the steps of:

in the floating point means and in each cycle of operation thereof, (a) determining whether the floating point means is in an available condition or is in an idle condition;

(b) asserting an available signal to the central processor means, the assertion of the available signal being expressive of a condition wherein the floating point means is free to accept a next instruction, or (c) asserting an idle signal to the central processing means, the assertion of the idle signal being expressive of a condition wherein the floating point means is free to accept a next instruction and also a condition wherein the floating point means is not presently executing an instruction of will not be executing an instruction in a next cycle of operation.

3. The method of claim 2, wherein:

the floating point means includes an instruction queue means coupled to the central procesor means instruction fetching and decoding means for receiving therefrom and storing the recieved instructions in advance of an instruction presently being executed, and the floating point means is free to accept a next instruction when there is room for storage of a next instruction in the instruction queue.

4. The method of claim 1 and further comprising the initial steps of:

in the central processor means, decoding an instruction to determine whether the instruction is a floating point instruction, and if the instruction is determined to be a floating point instruction, then asserting to the floating point means a load instruction signal indicating that the central processor means has detected a floating point instruction, and is the floating point means, responsive to the assertion of a load instruction signal from the central processor means, accepting the floating point instruction from the central procesor means instruction fetching and decoding means.

5. The method of claim 1 wherein the central processor means and floating point means each includes internal clock means for generating a clock for independently controlling their cycles of operation, wherein the central processor and floating point means are each operable for executing instructions independently of each other, and wherein the central processor means clock is provided to the floating point means, and further comprising the steps of:

in the central processor means, (a) detecting a floating point instruction of the first group wherein a transfer of data between the floating point means and the memory means is required, (b) asserting to the floating point means a data transfer signal for indicating that a data transfer is to be executed, and (c) asserting to the floating point means an end of central processor cycle signal for indicating when the bus means is available for a data transfer, and in the floating point means, (d) detecting the assertion of the end of cycle signal and the data transfer signal, (e) synchronizing the floating point means clock to the central processor means clock, and (f) executing the data transfer required by the instruction.

6. The method of claim 1 wherein the central processor means and floating point means each includes internal clock means for generating a clock for independently conrolling their cycles of operation, wherein the central processor means and floating point means are each operable for executing instructions independently of each other, and wherein the central processor means clock is provided to the floating point means, and further comprising the steps of:

in the central processor means, (a) asserting an end of central processor cycle signal for indicating when the central processor means has completed execution of an operation, and in the floating point means, (b) detecting the assertion of the end of cycle signal, (c) detecting the existence of an idle state in the floating point means, and (d) synchronizing the floating point clock to the central processor means clock.

7. The method of claim 1 wherein the floating point means further includes instruction address means coupled to the bus means for receiving therefrom and storing the received address of a floating point instruction to be executed by the floating point means, and further comprising the steps of:

in the central processor means (a) detecting the occurrence of a floating point instruction, (b) asserting an instruction signal for indicating that a floating point instruction is being dispatched to the floating point means, and in the floating point means (c) detecting the assertion of the instruction signal, and (d) loading the instruction address from the bus means and into the instruction address means.

8. The method of claim 7 wherein the processor means further includes means responsive to the execution of floating point instructions for detecting the occurrence of exception conditions, and further comprising the steps of:

in a floating point means, (a) detecting an exception condition in the floating point means, (b) asserting to the central processor means an exception signal indicating that an exception condition has occurred, and (c) transferring the address of the instruction in which the exception condition occurred from the instruction address means to the bus means, and in the central processor means, (d) detecting the assertion of the exception signal, and (e) receiving the instruction address from the bus means and initiating a corresponding exception handling operation.

9. The method of claim 1, wherein:

the first group of instructions includes instructions requiring a transfer of data into or out of the floating point means.

10. The method of claim 1, wherein:

the first group of instructions includes instructions whose execution may effect the operation of the central processing means.

11. In an information processing system including memory means for storing instructions and operands, central processor means including means for fetching and decoding instructions and operands, bus means connected between the processor and memory means, floating point means connected from the bus means and responsive to decoded floating point instructions for performing floating point operations, and means for controlling the execution of floating point instructions, said means for controlling the execution of floating point instructions comprising:

in the central processor means instruction type determining means for determining whether a floating point instruction is a member of a first group of instructions requiring an interlock of operation between the floating point means and the central processor means or is a member of a second group of instructions not requiring interlock of operation between the floating point means and the central processor means;

state determining means for determining whether the floating point means is in an idle state or is in an available state; and floating point instruction dispatching means, responsive to the operation of said instruction type determining means and to the operation of said state determining means, for dispatching to said floating point means an instruction belonging to said first group when said floating point means is determined be in an idle state and for dispatching to said floating point means an instruction belonging to said second group when said floating point means is determined to be in an available state.

12. The means for controlling the execution of floating point instructions of claim 11 and further comprising:

in the floating point means, means for determining in each cycle of operation thereof whether the floating point means is in an available or is in an idle condition;

means for asserting an available signal to the central processor means, the assertion of the available signal being expressive of a condition wherein the floating point means is free to accept a next instruction; and means for asserting an idle signal to the central processor means, the assertion of the idle signal being expressive of a condition wherein the floating point means is free to accept a next instruction and also a condition wherein the floating point means is not presently executing an instruction or will not be executing an instruction in the next cycle of operation.

13. The means for controlling the execution of floating point instructions of claim 12, wherein:

the floating point means includes an instruction queue means coupled to the central processor means instruction fetching and decoding means for receiving therefrom and storing at least one next instruction in advance of an instruction presently being executed, and wherein the floating point means is free to accept a next instruction when there is room for storage of a next instruction in the instruction queue means.

14. The means for controlling the execution of floating point instructions of claim 11 and further comprising:

in the central processor means, means responsive to the occurrence of a floating point instruction for asserting to the floating point means a load instruction signal for indicating that the central processor means has detected a floating point instruction, and in the floating point means, means, responsive to the assertion of the load instruction signal by the central processor means, for receiving the floating point instruction from the central processor means floating point instruction dispatching means.

15. The means for controlling the execution of floating point instructions of claim 11 wherein the central processor means and floating point means each includes internal clock means for generating a clock for independently controlling their cycles of operation, wherein the central processor and floating point means are each operable for executing instructions independently of each other, and wherein the central processor means clock is provided to the floating point means, and further comprising:

in the central processor means, means responsive to the detection of a floating point instruction of the first group wherein a transfer of data between the floating point means and the memory means is required, for asserting to the floating point means a data transfer signal for indicating that a data transfer is to be executed, and means, responsive to the operation of the central processor means, for asserting an end of central processor cycle signal for indicating when the bus means is available for a data transfer, and in the floating point means, means, responsive to the assertion of the end of cycle signal and to the assertion of the data transfer signal, for synchronizing the floating point means clock to the central processor means clock and for executing the data transfer required by the instruction.

16. The means for controlling the execution of floating point instructions of claim 11 wherein the central processor means and floating point means each includes internal clock means for generating a clock for independently controlling their cycles of operation, wherein the central processor means and floating point means are each operable for executing instructions independently of each other, and wherein the central processor means clock is provided to the floating point means, and further comprising:

in the central processor means,
means responsive to operation of the central processor means for asserting an end of central processor means cycle signal for indicating when the bus means is available for a data transfer, and
in the floating point means,
means responsive to the assertion of the end of cycle signal and to the existnce of an idle state in the floating point means for synchronizing the floating point means clock to the central processor means clock.

17. The means for controlling the execution of floating point instructions of claim 11 and further comprising:
in the central processor means,
means for detecting the occurrence of a floating point instruction and asserting an instruction signal for indicating that a floating point instruction is being dispatched to the floating point means, and
in the floating point means,
instruction address means coupled to the bus means for receiving therefrom and storing a received address of a floating point instruction to be executed by the floating point means, and
means, responsive to the assertion of the instruction signal, for loading the instruction address from the bus means and into the instruction address means.

18. The means for controlling the execution of floating point instructions of claim 17 and further comprising:
in the floating point means,
means, responsive to the execution of floating point instructions, for detecting the occurrence of exception conditions,
means for asserting to the central processor means an exception signal for indicating that an exception condition has occurred, and
means for transferring the address of the instruction in which the exception condition occurred from the instruction address means to the bus means, and
in the central processor means,
means, responsive to the assertion of the exception signal, for receiving the instruction address from the bus means and initiating a corresponding exception handling operation.

19. The means for controlling the execution of floating point instructions of claim 11, wherein:
the first group of instructions includes instructions requiring a transfer of data into or out of the floating point means.

20. The means for controlling the execution of floating point instructions of claim 11 wherein:
the first group of instructions includes instructions whose execution may effect the operation of the central processing means.

21. A data processing system comprising:
memory means for storing data and instructions, including floating point instructions;
processor means coupled to said memory means though a bus means for receiving said instructions and data therefrom, said
processor means comprising instruction decoding means for determining if a received instruction is a floating point instruction, said decoding means further being operable for decoding an instruction into one or more corresponding microinstructions for execution by said processor means;

floating point execution (FPE) means for executing floating point instructions, said FPE means being coupled to said memory means and to said processor means through said bus means, said FPE means comprising FPE state determining means for determining an internal state of said FPE means, said FPE means having at least an IDLE state and an AVAILABLE state, said FPE means further comprising floating point instruction queue means coupled to said bus means for storing at least one floating point instruction in advance of execution of the floating point instruction; and
interface means for coupling said processor means to said FPE means, said interface means comprising signal lines each of which belongs to either a first or a second group of signal lines, said first group of signal lines comprising signal lines sourced by said processor means and received by said FPE means and said second group of signal lines comprising signal lines sourced by said FPE means and received by said processor means, wherein said first group of signal lines comprises:
at least one signal line having a logic state expressive of the end of execution of one of said processor means microinstructions;
at least one signal line having repetitive logic states defining a clock for generating an internal timing clock for both said processor means and said FPE means, said internal timing clock of said FPE means defining at least microcycles related to the execution of said floating point instructions;
at least one signal line having a logic state expressive of said processor means executing one or more instructions corresponding to a TRAP processing state;
at least one signal line having a logic state expressive of an occurrence of a data transfer between said processor means and said FPE means over said bus means;
at least one signal line having a logic state expressive of said processor means notifying said FPE means to enter a WAIT state related to the transfer of data between said processor means and said FPE means, the WAIT state including a synchronization of said FPE internal timing clock to said processor means internal timing clock;
at least one signal line having a logic state expressive of said processor means providing one of said floating point instructions to said FPE means;
at least one signal line having a logic state expressive of said processor means notifying said FPE means to load one of said floating point instructions into said floating point instruction queue means;
at least one signal line having a logic state expressive of said processor means notifying said FPE means to exit said WAIT state; and
at least one signal line having a logic state expressive of said processor means notifying said FPE means to load an address of a location in said memory means associated with one of said floating point instructions;
and wherein said second group of signal lines comprises:

at least one signal line having a logic state expressive of said FPE means notifying said processor means that said state determining means has determined said FPE means to be in said IDLE state;

at least one signal line having a logic state expressive of said FPE means notifying said processor means that said state determining means has determined said FPE means to be in said AVAILABLE state;

at least one signal line having a logic state expressive of said FPE means notifying said processor means that said FPE means has detected the occurrence of an exception processing state related to the execution of one of said floating point instructions; and at least one signal line having a logic state expressive of a logical or arithmetic condition generated by the execution of one of said floating point instructions.

22. A data processing system as defined in claim 21 wherein said state determining means determines the occurrence of said IDLE state when said FPE means is not executing one of said floating point instructions;

said FPE means floating point instruction queue means is empty; and said FPE means has determined that no exception processing state has occurred.

23. A data processing system as defined in claim 22 wherein said state determining means determines the occurrence of said AVAILABLE state when said FPE means floating point instruction queue means is empty or will be empty at the completion of a next microcycle; and said FPE means has determined that no exception processing state has occurred.

* * * * *